3,379,699
DYEABLE, FLAME RESISTANT TETRAPOLYMER
Ernest F. Stroh, Decatur, Ala., assignor to Monsanto Company, St. Louis, Mo., a corporation of Delaware
No Drawing. Filed Oct. 5, 1964, Ser. No. 401,651
8 Claims. (Cl. 260—78.5)

ABSTRACT OF THE DISCLOSURE

A dyeable flame-resistant polymer capable of being formed into fibers containing at least about 60 percent acrylonitrile, between about 5 and about 35 percent of an α-haloalkylacrylonitrile, between about 2 and about 8 percent of a vinyl monomer being copolymerizable therewith, and between about 0.1 and about 3 percent by weight of a compound being receptive to basic dyes.

---

It is well known in the art that polymers of polyacrylonitrile do not have good flame resistant properties nor are they highly receptive to basic dyes without the incorporation of certain basic dye receptive monomers therein. To improve the dye receptivity of this polymer, a vinyl monomer, such as vinyl acetate, is generally copolymerized with the acrylonitrile thereby increasing the receptivity of the resulting fibers for dyes while also serving as a plasticizer. Where the monomers are polymerized by means of a redox catalyst which is generally sodium persulfate, it is believed that acid groups attach to the macromolecules, the acid groups probably being sulfonic or sulfonate groups derived from the catalytic system. These acid groups have an affinity for basic dyestuffs and, therefore, further increase the dye uptake of the polymer.

It is also known to copolymerize vinylidene chloride or vinyl chloride with acrylonitrile, the resulting polymer having flame resistant properties. These polymers generally result in fibers of poor original color, poor thermal stability and poor dye acceptance. The polymers comprising acrylonitrile, vinyl acetate and vinylidene chloride and the polymers comprising acrylonitrile, vinylidene chloride, and itaconic acid, gave fibers which were still grossly deficient in dyeability as far as commercial applications are concerned. However, these fibers did have an improved color and thermal stability as compared with the acrylonitrile-vinylidene copolymer fiber composition. The development of the acrylonitrile, vinyl acetate, vinylidene chloride and itaconic acid tetrapolymer process as disclosed in an application filed June 24, 1963, by Monsanto Company having the S.N. 300,402 yielded fibers which exhibited improved basic dyeability, dye light stability, original color, thermal stability and flame retardancy. The trend of improved fiber color and thermal stability of the flame resistant fibers became more apparent as the fiber composition deviated from the initial acrylonitrile-vinylidene chloride copolymer. The vinylidene chloride monomer copolymerized with acrylonitrile to form a linear polymer chain which lacked thermal stability. The addition type polymerization reactions, as exhibited by the acrylonitrile-vinyl acetate-vinylidene chloride, the acrylonitrile-vinylidene chloride-itaconic acid terpolymers and the acrylonitrile-vinyl acetate-vinylidene chloride-itaconic acid tetrapolymers have modified or changed the random sequence of the vinylidene chloride groups in the linear polymer chains by the incorporation of these other comonomers with acrylonitrile and vinylidene chloride. Possible clues to the vinylidene chloride instability is the fact that both chlorine atoms are attached to the same carbon atom in the vinylidene chloride molecule and these chlorine atoms are centers of high electron density. It is believed that upon heating polymers containing vinylidene chloride, the withdrawal of electrons from the neighboring atoms within the polymer chain initiates cleavage and hydrochloric acid or halogen containing by-products are given off with subsequent color formation through a stability rearrangement of the remaining atoms of the polymer chain.

It was thought that an improvement could be made in the tetrapolymer by replacing the vinylidene chloride monomer with a monomer having improved original color and thermal stability as well as flame retardancy. Particular emphasis was placed on selecting and evaluating monomers which do not simulate or duplicate the molecular structure of vinylidene chloride, that is, halogen atoms attached on C=C atoms which are polymerized directly onto the linear polymer chain. Of the numerous halogen containing mono-olefinic monomers investigated, the halogenated, acrylonitrile monomers, α-chloroacrylonitrile, α-chloromethylacrylonitrile and α-bromomethylacrylonitrile were selected for complete evaluation. In the latter two, the halogen atom was spaced away from the linear chain of polymerization by having a carbon atom inserted therebetween. This separated the centers of high electron density from the polymer backbone. The halogen so spaced does not interfere with the dye uptake of the polymer and is better positioned to combat the propagation of flames. Each of these monomers were copolymerized with a mixture of acrylonitrile, vinyl acetate and itaconic acid monomers to form new tetrapolymer compositions.

Therefore, an object of this invention is to provide a tetrapolymer which is both flame resistant and dyeable.

Another object of this invention is to provide acrylonitrile polymers with improved basic dyeability by incorporating therein α-chloromethylacrylonitrile.

A further object of this invention is to provide acrylonitrile polymers with improved basic dyeability by incorporating α-bromomethylacrylonitrile therein.

A further object of this invention is to provide a halogenated acrylonitrile polymer having the halogen atom indirectly connected to the main polymer chain which is polymerized with other monomers to form a flame resistant, dyeable tetrapolymer.

A still further object of this invention is to provide a process for preparing flame resistant and dyeable acrylonitrile polymers.

Other objects and advantages of this invention will be apparent to those skilled in the art from the following more detailed descirbtion which illustrates and discloses but is not intended to limit the scope of this invention.

Interpolymers of acrylonitrile and monomers thereof, having chlorine incorporated therein in sufficient proportions to impart the desired properties of non-flameability to fibers, acquires the properties of receptivity for dyes by the addition of at least two other comonomers of particular functions. The interpolymer should contain from two to eight percent of at least one vinyl monomer having side groups of higher stearic hindrance dimension than the cyanide group, such as, vinyl acetate, methyl acrylate, methylmethacrylate, ethyl acrylate, ethylmethacrylate, styrene, α-methylstyrene, acrylamide, N-methyl and N-ethyl-acrylamide, and the like. Also, the interpolymer should contain from 0.1 to 3 percent, and preferably from 0.5 to 2 percent of at least one monomer which has an acid function available for receiving basic dyes, such as, itaconic acid, cinnamic acid, maleic acid or the anhydride thereof, carboxy vinyl phthalic acids, and vinyl benzene sulfonic acid.

Any suitable polymerization process known in the art may be used, such as, mass polymerization methods, solution polymerization methods and aqueous emulsion procedures. However, the preferred practice utilizes suspension polymerization wherein the monomers are polymerized batchwise in an aqueous medium containing the necessary catalyst and dispersing agents. Another suitable method is the semi-continuous procedure in which the polymerization reactor containing the aqueous medium is continuously charged with the desired monomers and the polymer is withdrawn at the completion of a predetermined reaction cycle.

The polymerization is catalyzed by means of water-soluble salts of peroxy acids, sodium peroxide, hydrogen peroxide, sodium peroborate, the sodium salts of other peroxy acids peroacids, or other water-soluble compounds containing the peroxy group: (—O—O—). A wide variation in the quantity of peroxy compounds is possible. For example, from 0.1 to 3.0 percent by weight of the polymerizable monomers may be used. The so called redox catalyst system also may be used. Redox agents are generally compounds in a lower valence state which are readily oxidized to the higher valence state under the conditions of reaction. Through the use of this reduction-oxidation system, it is possible to obtain polymerization to a substantial extent at lower temperatures than otherwise would be required. Suitable "redox" agents are sulfur dioxide, the alkali metal, ammonium bisulfite and sodium formaldehyde sulfoxylate. The catalyst may be charged at the outset of the reaction or it may be added continuously or in increments throughout the reaction for the purpose of maintaining a more uniform concentration of catalyst in the reaction mass. The latter method is preferred, because it tends to make the resultant polymer more uniform in regard to its chemical and physical properties. Although the uniform distribution of the reactants throughout the reaction mass can be achieved by vigorous agitation, it is generally desirable to promote this uniform distribution among the reagents by using inert wetting agents or emulsion stabilizers. Suitable reagents for this purpose are the water-soluble salts of fatty acid, such as, sodium oleate and potassium stearate, mixtures of water-soluble fatty acids salts, such as, common soaps prepared by the saponification of animal and vegetable oil, the "amino soaps," such as salts of diethanolamine and dodecylmethylamine, salts of resin acids and mixtures thereof, the water-soluble salts of half esters of sulfonic acid and long chain aliphatic alcohols, sulfonated hydrocarbons, such as alkyl aryl sulfonates, and any other of the wide variety of wetting agents, which are in general organic compounds containing both hydrophobic and hydrophilic radicals. The quantity of emulsifying agents will depend upon the particular agent selected, the ratio of monomer to water to be used, and the conditions of polymerization. In general, however, from 0.1 to 1.0 weight percent based on the weight of the monomers can be employed.

The emulsion polymerizations are preferably conducted in glass or glass lined vessels which have means for agitating the contents therein. Generally, rotary stirring devices are the most effective means of insuring the intimate contact of the reagents, but other methods may be successfully employed, for example, by rocking or rotating the reactors. The polymerization equipment generally used is conventional in the art and the adaptation of a particular type of apparatus to the reaction contemplated is within the province of one skilled in the art.

The optimum methods of polymerization for preparing fiber-forming acrylonitrile polymers involve the use of polymerization regulators to prevent the formation of polymer units of excessive molecular weight. Suitable regulators are the alkyl and aryl mercaptans, carbon tetrachloride, chloroform, dibutyltin oxide, antimony trioxide, dithioglycidol and alcohols. The regulators may be used in amounts varying from 0.001 to 2 percent, based on the weight of the monomer to be polymerized.

The polymers from which the filaments are produced in accordance with the present invention have specific viscosities within the range of 0.10 to 0.40. The specific viscosity value, as employed herein, as represented by the formula.

$$N_{sp} = \frac{\text{Time of flow of polymer solution in seconds}}{\text{Time of flow of solvent in seconds}} - 1$$

Viscosity determination of the polymer solutions or solvents are made by allowing the solution to flow by gravity at 25° C. through a capillary viscosity tube. In the determinations herein, a polymer solution containing 0.1 grams of the polymer dissolved in 100 ml. of N,N-dimethylformamide was employed. Any other suitable solvent, such as, N,N-dimethylacetamide may also be used. The most effective polymers for the preparation of filaments are those of uniform physical and chemical properties and of relatively uniform molecular weight.

The following examples are cited to illustrate the invention and they are not intended to limit the invention in any way. Unless otherwise noted, "parts" as expressed in the examples indicate parts by weight.

Example I

A reactor being equipped with internal baffles, an agitator and a water temperature control bath was charged with 300 parts of de-ionized water. The reactor feeds consisted of a monomer mix, a catalyst solution and an activator solution. The monomer mix was comprised of 72.8 parts of acrylonitrile, 5 parts of vinyl acetate, 21.7 parts of α-chloromethylacrylonitrile and 0.5 part of itaconic acid. To the monomer mix, 1 part of potassium persulfate was added which functioned as a catalyst and 0.92 part of sodium bisulfite which provided a source of the sulfur dioxide activator. An initiator being $FeSO_4 \cdot 7H_2O$ was added to the solution in the quantity necessary to obtain 0.15 part per million based on the weight of the monomer of $Fe^{++}$. The water to monomer ratio was approximately 3 to 1 with sodium lauryl sulfate being added to improve the particle size of the polymer product. The reactor pH during polymerization was 2.7.

After the reactor feeds were exhausted, the polymer slurry contents were heated from 90 to 95° C. to distill and recover any unreacted monomers. The polymer product was then recovered by filtration and washed to remove any impurities therefrom. The polymer was then dried and ground for use in fiber production.

The polymer product was analyzed for specific viscosity ($N_{sp}$), percent water, percent vinyl acetate and percent chlorine ions. The analysis showed that the specific viscosity was 0.119, the percent water was 0.69 percent of the total weight of the polymer; the polymer was also comprised of 10.15 percent chlorine meaning that the total polymer was comprised of approximately 29 percent of α-chloromethylacrylonitrile.

A small amount of polymer material was used to prepare a dope for color evaluation. A quantity of polymer was dissolved in dimethylacetamide which is a solvent for acrylonitrile in the amount to give a 17.5 percent solids solution. This sample was placed in an oven for 40 minutes at 90° C. The dope color after heating was found to be excellent. The visual improvement in dope color of flame retardant fiber compositions was gratifying since a replacement for vinylidene chloride had been found which showed improved color and thermal stability.

The fiber which was spun from the polymer did not propagate flames and showed a high degree of brightness and purity when tested on a General Electric Spectrophotometer. The basic dye acceptance was determined by applying a standard basic dyestuff, Sevron Blue 2G (Color Index Basic Blue 22), to the fibers in a standard dye bath and determining the amount of dyestuff affixed to the fibers. The basic dye acceptance in this example was 21.

Example II

The polymerization process of Example I was repeated wherein the reactor was charged with 300 parts of water, 85.5 parts of acrylonitrile, 12 parts of α-chloromethylacrylonitrile, 2 parts of vinyl acetate and 0.5 part of itaconic acid. The resulting polymer which had a $N_{sp}$ of 0.125 and a basic dye receptance of 20 percent. This highly dyeable fiber was also flame resistant.

Example III

Using the polymerization process of Example II, the reactor was charged with 300 parts of water, 88.5 parts of acrylonitrile, 7 parts of α-bromoethylacrylonitrile, 4 parts of vinyl acetate and 0.5 part of itaconic acid. This resulted in approximately 2 percent of the fiber by weight being comprised of bromine which provided a higher percentage of acrylonitrile per polymer length. The resulting fiber was highly dyeable and flame resistant.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

I claim:

1. A composition of matter being a dyeable, flame resistant tetrapolymer comprising at least 60 percent acrylonitrile, at least 5 percent and up to 35 percent of an α-haloalkylacrylonitrile, between about 2 and about 8 percent of a vinyl monomer being copolymerizable therewith and having side groups of higher stearic hindrance dimension than the cyanide group of the acrylonitrile monomer and between about 0.1 and about 3 percent by weight of a compound being receptive to basic dyes.

2. A composition of matter comprising at least 60 percent acrylonitrile, up to 35 percent of a compound having a halogen atom indirectly connected to an acrylonitrile group, between about 2 and about 8 percent vinyl acetate and between about 0.1 and about 3 percent by weight of itaconic acid.

3. The composition of matter of claim 2 wherein the halogen atoms is connected to the alpha carbon atom of the acrylonitrile group by means of a carbon atom.

4. The composition of matter claim 3 wherein the halogen atom is chlorine.

5. The composition of matter of claim 3 wherein the halogen atom is bromine.

6. A composition of matter comprising at least 60 percent acrylonitrile, up to 35 percent of a compound being comprised of acrylonitrile having a halogen atoms indirectly connected to the alpha carbon atom of said acrylonitrile group, between about 2 and about 8 percent vinyl acetate and 0.10 percent by weight of a monomeric material being receptive to basic dyes.

7. A composition of matter comprising at least 80 percent of acrylonitrile, up to 18.5 percent of α-chloromethylacrylonitrile, between about 2 and about 8 percent of vinyl acetate and from 0.10 to 5 percent by weight of itaconic acid.

8. A composition of matter comprising at least 85 percent acrylonitrile, at least 5 percent of α-bromomethylacrylonitrile, between about 2 and about 8 percent of vinyl acetate and between about 0.1 and about 3 percent of itaconic acid.

References Cited

UNITED STATES PATENTS

| | | | |
|---|---|---|---|
| 3,255,158 | 6/1966 | Anthes | 260—85.5 |
| 3,268,490 | 8/1966 | Sunden et al. | 260—85.5 |
| 3,310,535 | 3/1967 | Mazzolini et al. | 260—78.5 |

JOSEPH L. SCHOFER, *Primary Examiner.*

J. KIGHT, *Assistant Examiner.*